US006760412B1

(12) United States Patent
Loucks

(10) Patent No.: US 6,760,412 B1
(45) Date of Patent: Jul. 6, 2004

(54) REMOTE REMINDER OF SCHEDULED EVENTS

(75) Inventor: Vaughan W. Loucks, Maitland (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/468,136

(22) Filed: Dec. 21, 1999

(51) Int. Cl.$^7$ .................................................. H04M 1/64
(52) U.S. Cl. .............................. 379/88.13; 379/207.03; 379/210.01
(58) Field of Search .......................... 379/88.12–88.18, 379/88.22–88.25, 88.27, 88.28, 207.02, 207.04, 207.05, 207.08–207.1, 207.11, 209.01, 210.01; 370/351–354, 400, 401

(56) References Cited

U.S. PATENT DOCUMENTS

| | | | | | |
|---|---|---|---|---|---|
| 4,602,129 | A | * | 7/1986 | Matthews et al. | 379/88.26 |
| 5,247,568 | A | * | 9/1993 | Bergsman et al. | 379/88.23 |
| 5,289,531 | A | | 2/1994 | Levine | |
| 5,333,180 | A | * | 7/1994 | Brown et al. | 379/88.06 |
| 5,371,787 | A | * | 12/1994 | Hamilton | 379/386 |
| 5,638,424 | A | * | 6/1997 | Denio et al. | 379/88.18 |
| 5,644,624 | A | * | 7/1997 | Caldwell | 379/69 |
| 5,646,982 | A | | 7/1997 | Hogan et al. | |
| 5,652,789 | A | * | 7/1997 | Miner et al. | 379/201.01 |
| 5,870,454 | A | * | 2/1999 | Dahlen | 379/88.14 |
| 5,929,774 | A | | 7/1999 | Charlton | |
| 5,991,370 | A | * | 11/1999 | Ladd | 379/88.25 |
| 6,038,542 | A | * | 3/2000 | Ruckdashel | 705/9 |
| 6,144,942 | A | * | 11/2000 | Ruckdashel | 705/9 |
| 6,182,041 | B1 | * | 1/2001 | Li et al. | 704/260 |
| 6,233,319 | B1 | * | 5/2001 | Cox et al. | 379/88.22 |
| 6,259,772 | B1 | * | 7/2001 | Stephens et al. | 379/88.23 |
| 6,269,151 | B1 | * | 7/2001 | Hanson | 379/69 |
| 6,310,947 | B1 | * | 10/2001 | Polcyn | 379/211.01 |
| 6,404,880 | B1 | * | 6/2002 | Stevens | 379/221.11 |
| 6,430,281 | B1 | * | 8/2002 | Morley et al. | 379/210.01 |
| 6,438,217 | B1 | * | 8/2002 | Huna | 379/88.14 |

OTHER PUBLICATIONS

Excite Inc., Planner, downloaded from web page wysiwig://142/http://plannerpreview.excite.com/servlet/hclier on Aug. 30, 1999.
Dialogic an Intel Company, D/4PCI "4–Port Voice Processing for Small and Medium Enterprise Applications", Dialogic Voice Products, downloaded from web page www.dialogic.com/products/d_sheets/5795web.html on or before Dec. 1, 1999.

* cited by examiner

Primary Examiner—Roland Foster

(57) ABSTRACT

A modification to a scheduling program is disclosed that allows event reminders to be sent via the telephone network. If a reminder is required, a telephone session is initiated between the computer in which the scheduling program is operating and the user's telephone station. Next, an event reminder is converted from a text format to an audible format with use of a text-to-voice converter and sent to the user's telephone station in order to be heard by the user. This allows for the event reminders to be received by the user whether he/she is local to his/her personal computer or not. A further modification to a scheduling program is disclosed that allows event reminders to be sent in series using a variety of different reminder techniques. If a first attempt to send a reminder to the user fails, a second attempt using a different technique, such as a different telephone directory number, is initiated.

10 Claims, 10 Drawing Sheets

| REMINDER PREFERENCES | | | | | |
|---|---|---|---|---|---|
| 140 | 142 | PRIORITY ORDER NORMAL 144 | PRIORITY ORDER WEEKEND 146 | ATTEMPTS 148 | DELAY (MIN) 149 |
| DISPLAY SCREEN | N/A | 1 | ☐ | ☐ | ☐ |
| EMAIL | ABC@XXXXX.COM | 4 | 3 | ☐ | ☐ |
| PAGER (EMAIL ADDRESS) | XYZ@XXXXX.COM | 4 | ☐ | ☐ | ☐ |
| WORK TELEPHONE | 613-555-1111 | 3 | ☐ | 3 | 5 |
| WIRELESS TELEPHONE | 613-5551112 | 2 | 1 | 2 | 10 |
| HOME TELEPHONE | 613-555-1113 | ☐ | 2 | 2 | 1 |
| FACSIMILE | 613-555-1114 | 4 | ☐ | ☐ | ☐ |
| PAGER (DIRECTORY NUMBER) | 613-555-1115 | ☐ | 3 | ☐ | ☐ |

CREATE NEW SELECTION OPTION — 152
CREATE NEW PRIORITY ORDER — 150

| EVENT MESSAGE 50 | START TIME 52 | END TIME 54 | REMIND TIME 56 | PRIORITY ORDER SETTINGS 58 |
|---|---|---|---|---|
| MEETING WITH CLIENT X AT ONE O'CLOCK | 1300 09/30/1999 | 1600 09/30/1999 | 1130 09/30/1999 | NORMAL |
| PICNIC AT OAK PARK AT ELEVEN O'CLOCK | 1100 10/02/1999 | 1300 10/02/1999 | 0900 10/02/1999 | WEEKEND |
| GRANDMOTHER'S BIRTHDAY TODAY | 0000 09/30/1999 | 2359 09/30/1999 | 0800 09/30/1999 | DISPLAY ONLY |
|  |  |  |  |  |

FIG. 3A

| EVENT MESSAGE 50 | START TIME 52 | END TIME 54 | REMIND TIME 56 | PRIORITY ORDER SETTINGS 58 |
|---|---|---|---|---|
| AAAAA.wav | 1300 09/30/1999 | 1600 09/30/1999 | 1130 09/30/1999 | NORMAL |
| AAAAB.wav | 1100 10/02/1999 | 1300 10/02/1999 | 0900 10/02/1999 | WEEKEND |
| AAAAC.wav | 0000 09/30/1999 | 2359 09/30/1999 | 0800 09/30/1999 | DISPLAY ONLY |
|  |  |  |  |  |

FIG. 3B

| REMINDER PREFERENCES | | | | |
|---|---|---|---|---|
| 140 ↘ | 142 ↘ | PRIORITY ORDER NORMAL 144 | PRIORITY ORDER WEEKEND 146 | ATTEMPTS 148 | DELAY (MIN) 149 |
| DISPLAY SCREEN | N/A | 1 | | | |
| EMAIL | ABC@XXXXX.COM | 4 | 3 | | |
| PAGER (EMAIL ADDRESS) | XYZ@XXXXX.COM | 4 | | | |
| WORK TELEPHONE | 613-555-1111 | 3 | | 3 | 5 |
| WIRELESS TELEPHONE | 613-555-1112 | 2 | 1 | 2 | 10 |
| HOME TELEPHONE | 613-555-1113 | | 2 | 2 | 1 |
| FACSIMILE | 613-555-1114 | 4 | | | |
| PAGER (DIRECTORY NUMBER) | 613-555-1115 | | 3 | | |
| CREATE NEW SELECTION OPTION ~152 | | | | | |
| CREATE NEW PRIORITY ORDER ~150 | | | | | |

FIG. 7

REMOTE REMINDER OF SCHEDULED EVENTS

FIELD OF THE INVENTION

This invention relates generally to event scheduling logic and, in particular, to apparatus and methods used by remote reminder operations within event scheduling logic.

BACKGROUND OF THE INVENTION

Historically people have used calendar books made of paper to organize their appointments by physically writing in appointments as they are made. This procedure can prevent the person from double booking a particular time, that being scheduling two or more events in the same time period. Further, the calendar book can be used as a quick reference to remind a person of the appointments that have previously been made.

As the world has moved away from recording information on paper with the computer revolution, scheduling software programs were developed that could electronically record a person's appointments. These scheduling programs, that typically operate on a person's personal computer, come in many varieties, but most of them have similar key features. One of the key features that these scheduling programs provide that the equivalent paper calendar books do not is the ability to set a time for the user to be reminded of an appointment and the ability to automatically remind the user of such appointments at the specified time. This removes the need for the user to regularly check the schedule program in order to determine imminent appointments. Using paper calendar books, the user or another person such as a secretary must regularly check the calendar book to ensure that no appointments are missed.

There are a number of well-known methods for scheduling programs to remind a user that an appointment is upcoming. The most popular of these well-known methods is to display a text message on the display screen corresponding to the personal computer the scheduling program is being run on and optionally to initiate an audible alert signal. Assuming the particular computer is currently powered and the user is currently local to the computer, the user should be able to hear the alert signal and then read the text message; hence remembering the appointment that is scheduled at the time specified. Problems occur when the computer is not powered and/or the user is not local to the computer.

One method to overcome the problem of the personal computer not being powered is to relocate the scheduling program to a central server such as an Internet Protocol (IP) server. In this case, the scheduling program is accessed through the Internet with individual subscribers setting up a scheduling account with the IP server. This removes the need for the user's personal computer to be powered at the time of the required reminder, but at the same time complicates the procedure used to remind the user of the appointment. One reminding technique that is used with the implementation of the scheduling program within an IP server is to send an email message to an address specified by the user at the time indicted for the user to be reminded. Unfortunately, to receive an email, the person would still typically need to be logged onto a computer and so there is still a need for a more mobile reminding procedure.

There is a variation to the email reminder system described above that enables the scheduling programs currently being operated on the Internet to become more mobile. This system requires a user to have a pager capable of displaying text messages and that has a corresponding email address. The scheduling program, when an appointment requires a reminder to be sent, sends an email containing the text message reminder to the pager's email address with the pager subsequently alerting the user and displaying the message.

There are a number of problems with this system of paging people reminders. For one, not everybody who may need mobile schedule reminding capabilities has a pager. Further, the majority of current pagers have only limited functionality such that extensive text messages cannot be displayed. Yet further, not everybody who has a pager carries the pager constantly, hence resulting in people missing important appointment reminders.

Another important problem with current reminder systems is the lack of intelligence utilized. The current scheduling programs can send a display message to a display screen of a personal computer, send an email notification to a user's email account, or page the person with text reminders. The problem with these reminder techniques is the inability of these systems to determine if the user actually receives the appointment reminder and the inability of the programs therefore to react if the user does not receive the appointment reminder.

SUMMARY OF THE INVENTION

A modification to a scheduling program in which event reminders are sent via the telephone network is disclosed. In this case, if a reminder must be sent, a telephone session is initiated between the computer in which the scheduling program is operating and the user's telephone station. Next, the event reminder is preferably converted from a text format to an audible format with use of a text-to-voice converter and sent to the user's telephone station in order to be heard by the user. In another embodiment, the appointment reminder is saved in an audible format so that no text-to-voice conversion is required prior to sending the reminder to the user's telephone station.

Further, a modification made to a scheduling program in which event reminders are sent in series and/or parallel using a variety of different reminder techniques is also disclosed. These reminder techniques include, but are not limited to, displaying a text message on a computer screen, sending an email message, sending a page text message, and sending audible voice messages to one of a voice mail account, work telephone, home telephone, and wireless telephone. Preferably, the present invention allows a user to select preferences including a priority order that dictates the sequence in which reminder techniques are to be attempted. A number of the reminder techniques preferably have confirmation requirements such that if such a confirmation is not returned, the next reminder technique in the priority order is initiated.

The present invention, according to a first broad aspect, is a computing apparatus arranged to be coupled through a network to at least one telephone station, the computing apparatus comprising event scheduling logic. The event scheduling logic stores event reminders, each event reminder including a remind time parameter and an event reminder text message. The event scheduling logic further monitors to determine if any of the remind time parameters are met. The event scheduling logic yet further, if one of the remind time parameters is met, initiates a telephone session between the computing apparatus and a predetermined telephone station coupled to the network, converts the event reminder text message corresponding to the reminder time parameter that is met to an event reminder audio message, and transmits the event reminder audio message, via the network, to the predetermined telephone station.

In preferred embodiments, the computing apparatus of the first broad aspect comprises a memory device, a processing device and a telephone line interface. The memory device stores the event reminders. The processing device, coupled to the memory device, monitors to determine if any of the remind time parameters are met and converts the event reminder text message to the event reminder audio message. Further, the processing device operates to control all the other operations of the event scheduling logic. The telephone line interface, coupled to the processing device and arranged to be coupled to a telephone line coupled to the network, initiates the telephone session and transmits the event reminder audio message, via the network, to the predetermined telephone station.

The present invention, according to a second broad aspect, is a computing apparatus comprising event scheduling logic. The event scheduling logic stores event reminders, each event reminder including a remind time parameter and an event reminder message. The event scheduling logic further monitors to determine if any of the remind time parameters are met. The event scheduling logic yet further, if one of the remind time parameters is met, initiates a first attempt to provide the event reminder message corresponding to the remind time parameter that is met to a user with use of a first reminder operation means, determines if the first attempt is successful and, if the first attempt is not successful, initiates a second attempt to provide the particular event reminder message to the user with use of a second reminder operation means.

In further aspects, the present invention is a computer readable memory that stores the event scheduling logic according to one of the first and second broad aspects and a method of performing an event scheduling operation according to one of the first and second broad aspects.

For preferred embodiments, the computing apparatus according to the first and second broad aspects is a personal computer. In alternative embodiments, the computing apparatus is a central server coupled to a packet-based network such as the Internet. In these alternative embodiments, the computing apparatus preferably comprises event scheduling that is capable of operating for a plurality of users.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The preferred embodiment of the present invention is described with reference to the following figures, in which:

FIGS. 3A and 3B are tables illustrating scheduled events in first and second formats respectively that are stored in the memory of FIG. 1 for a sample operation;

FIG. 7 is a display window illustrating a graphical user interface for selecting scheduler preferences according to a preferred embodiment of the present invention;

DETAILED DESCRIPTION OF THE PREFERRED EMBODIMENT

Embodiments of the present invention are directed to an event scheduling program being run on a computing apparatus, such as a personal computer, that operates to send event reminders. When the program determines an event reminder is required, the computing apparatus according to preferred embodiments operates to initiate a telephone session between itself and a telephone station specified by the user and, once the session has been established, to send an audio reminder message to the particular telephone station. Hence, the computing apparatus in these preferred embodiments must be capable of initiating telephone sessions and capable of sending audio signals via a telephone network.

Figure 1:
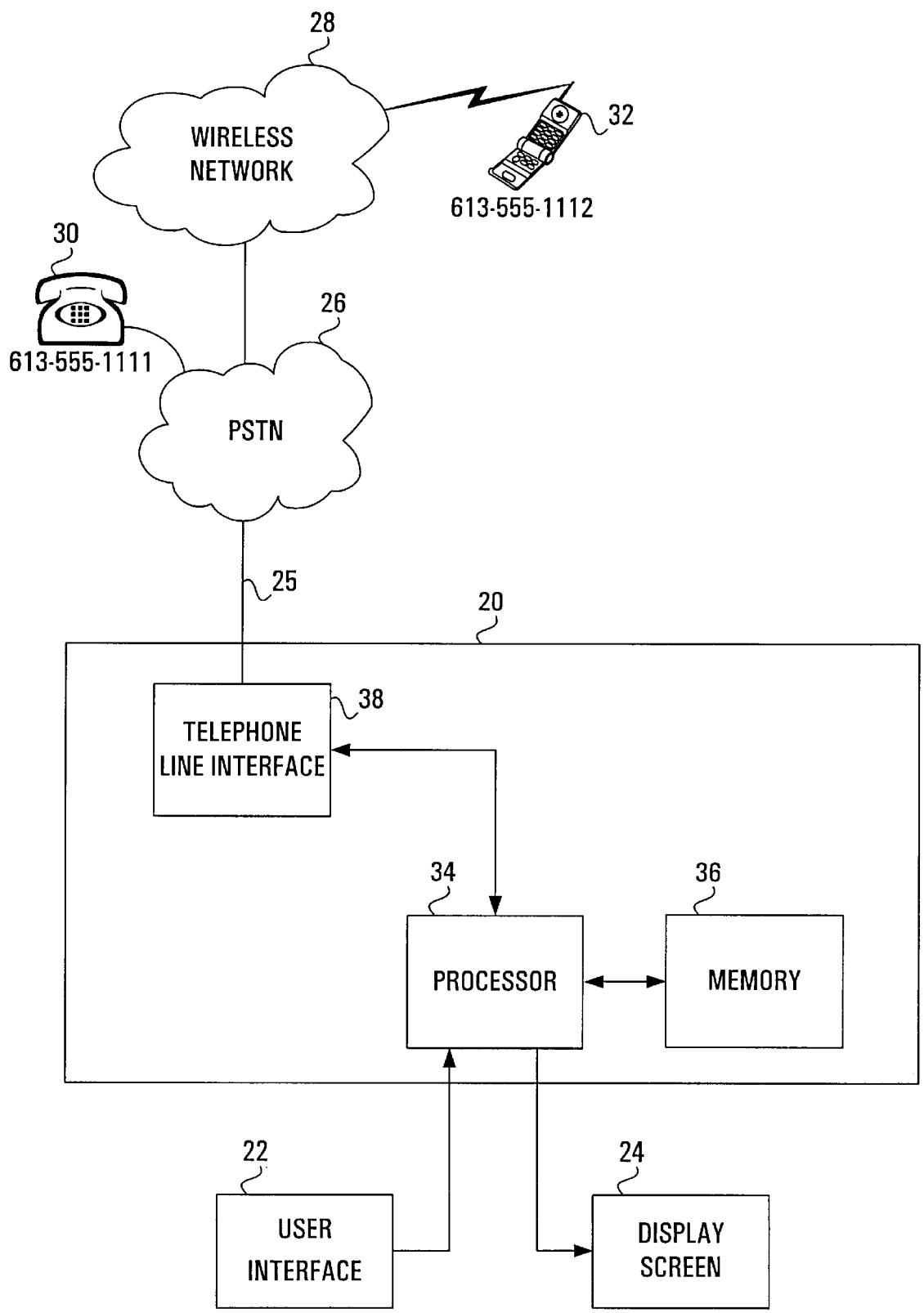
FIG. 1 is a simplified block diagram illustrating a first possible event reminder system according to embodiments of the present invention.

An example of a telephone system that includes a computing apparatus 20 in which preferred embodiments of the present invention may be implemented is depicted in simplified block diagram form within FIG. 1. In this figure, the computing apparatus 20, that is preferably a personal computer, is independently coupled to a user interface 22, that is preferably a keyboard and/or a mouse, and a display screen 24.

Further, the computing apparatus 20 is coupled, via a telephone line 25, to a Publicly Switched Telephone Network (PSTN) 26 which is further coupled to a wireless network 28. As depicted in FIG. 1, a first telephone station 30 is coupled to the PSTN 26 while a second telephone station 32 is coupled, via a wireless communication link, to the wireless network 28. In this case, the first telephone station 30 is a fixed wire telephone station with a directory number of 613-555-1111 while the second telephone station 32 is a wireless telephone station with a directory number of 613-555-1112. Of course, it should be understood that more telephone stations could be coupled to the PSTN 26 and/or the wireless network 28.

Within FIG. 1, the computing apparatus 20 comprises a processor 34 coupled to the user interface 22 and the display screen 24; a memory device 36 coupled to the processor 34; and a telephone line interface 38 coupled between the processor 34 and the telephone line 25. In normal operation, the processor 34 controls the overall operations within the computing apparatus 20 including receiving user inputs from the user interface 22, storing/retrieving data information to/from the memory device 36, sending/receiving digital signals to/from the telephone line interface 38, and displaying on the display screen 24 images such as Graphical User Interfaces (GUIs), text messages and other visual depictions that can aid the user.

As mentioned previously, in order to implement scheduling programs according to preferred embodiments of the present invention, the computing apparatus 20 must be capable of initiating telephone sessions between itself and a particular telephone station, and be capable of sending audio signals, via the telephone line 25, to the particular telephone station. Within the embodiment of FIG. 1, these operations require a minimum level of functionality within the telephone line interface 38, this minimum level of functionality being dependent upon the type of telephone line used and the format of the audio signals being received at the telephone line interface 38. In the following sample embodiments, it is noted that the telephone line 25 is an analog telephone line, though this should not limit the scope of the present invention.

In one preferred embodiment, that is now described with reference to the block diagram of FIG. 2, the telephone line interface 38 is a Personal Computer Interface (PCI) board such as a D/4PCI board produced by Dialogic Corporation of Parsippany, N.J. In this preferred embodiment, the telephone line interface 38 can either be implemented within a single computing device as depicted in FIG. 1, a personal computer in one example, or alternatively be implemented in a central server and therefore be shared within a network. In other embodiments, the telephone line interface 38 could comprise other components with the minimum functionality required for the operation of the preferred embodiments. For instance, in some embodiments, the telephone line interface is a modem with voice modem chipset support that has been modified for the requirements of the present invention. In yet other embodiments, application specific devices are used to implement the present invention, these application specific devices needing to comprise sufficient processing power to perform the functionality described below.

Figure 2:
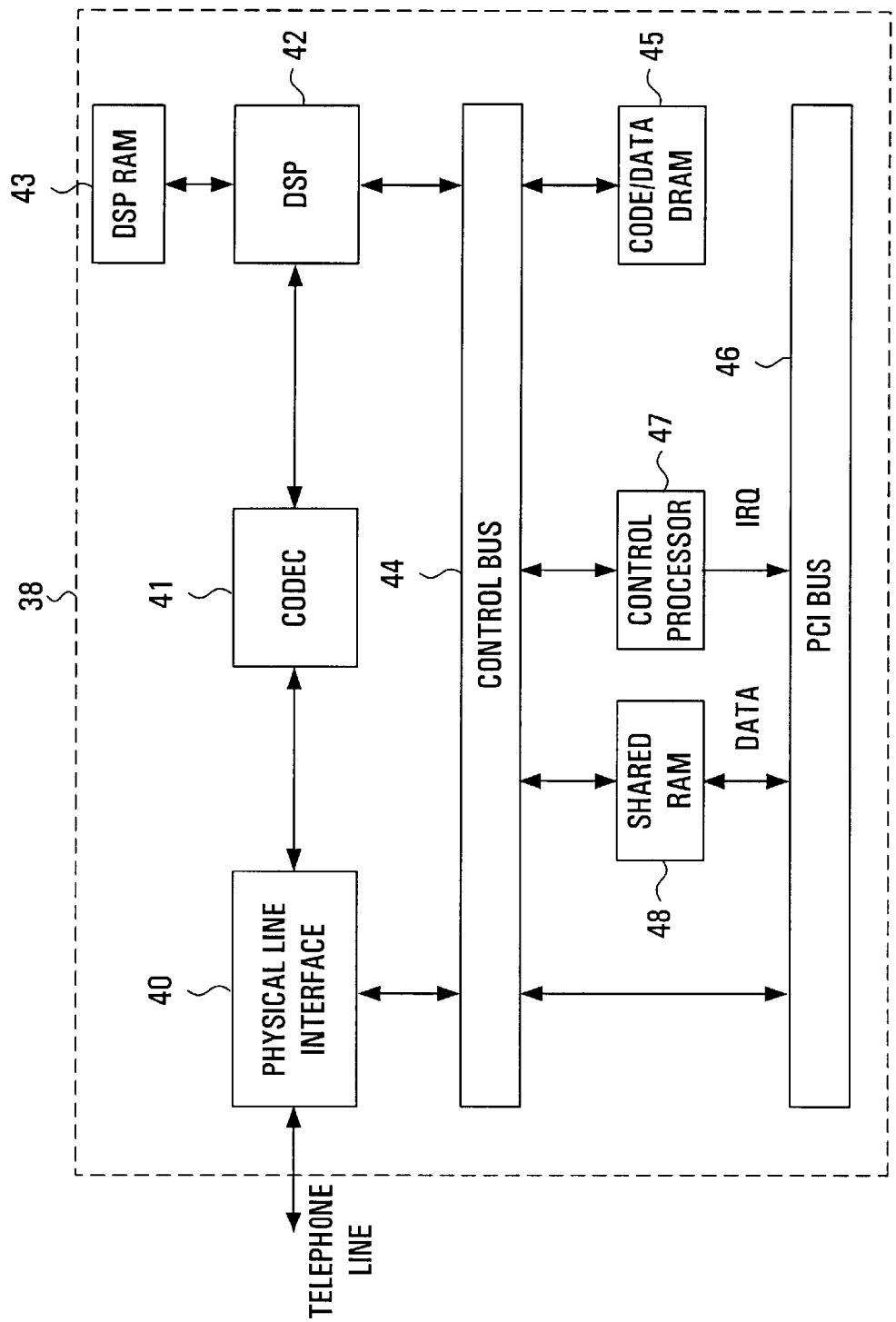
FIG. 2 is a block diagram illustrating a possible embodiment for the telephone line interface within FIG. 1.

As depicted in FIG. 2, the telephone line interface 38, according to this preferred embodiment, comprises a physical line interface 40 coupled to the telephone line 25, a COder/DECoder (CODEC) 41 coupled to the physical line interface 40, a Digital Signal Processor (DSP) 42 coupled to the CODEC 41, a DSP Random Access Memory (RAM) 43 coupled to the DSP 42, a control bus 44 coupled to the physical line interface 40 and the DSP 42, a Code/Data Dynamic RAM (DRAM) 45 coupled to the control bus 44; a Personal Computer Interface (PCI) bus 46 coupled to the control bus 44; a control processor 47 coupled to both the control bus 44 and the PCI bus 46; and a shared RAM 48 coupled to both the control bus 44 and the PCI bus 46. As will be described herein below, these components operate together to provide the functionality required in the preferred embodiment of the present invention. It should be understood that these components further support other operations not directly relevant to the present invention, these non-essential operations not being described herein.

The operation of initiating a telephone session, according to a preferred embodiment, will now be described for the PCI board of FIG. 2. In this case, a call initiation signal comprising the directory number that is to be dialed is sent from an algorithm being run on the processor 34, via the PCI bus 46, to the control processor 47. In this operation, the control processor 47 initially instructs the physical line interface 40 to transmit off-hook signalling to the PSTN 26. Next, the control processor 47 forwards the directory number to be dialed, via the control bus 44, to the DSP 42. The DSP 42 then proceeds to look-up digitized versions of the Dual Tone Multi-Frequency (DTMF) tones that correspond to the digits of the telephone station to be dialed and forward these digitized tones to the CODEC 41. The CODEC converts the tones into analog DTMF tones similar to that normally generated by a telephone when a person presses the dialpad buttons and further forwards these analog DTMF tones to the PSTN 26 via the physical line interface 40 and the telephone line 25.

The telephone line interface 38 of FIG. 2 has the functionality, at this point, to detect for ringing and busy tones being sent from the PSTN 26, as well as the capability to monitor for pick-ups being performed by a person or machine. In the particular example being illustrated in FIG. 2, the ringing and busy tones are conditioned by the physical line interface 40 and routed via the control bus 44 to the control processor 47. The control processor 47 responds to these signals and informs the algorithm being run on the processor 34 with ring or busy tone indications. The monitoring for a call to be answered (hence picked up), on the other hand, is preferably performed by the DSP 42. Audio signals received from the PSTN 26 are bandpassed filtered and conditioned by the physical line interface 40 and then applied to the CODEC 41. The CODEC 41 filters, samples, and digitizes the inbound analog audio signals and passes the digitized audio signals to the DSP 42. The DSP 42 analyzes these digital audio signals and can determine if a pick up has occurred and, if so, what type of pick up has occurred. This determination, although not perfect, can be done to high accuracy for the described example in which the telephone line interface 38 is a D/4PCI board produced by Dialogic Corporation. The DSP 42, according to the preferred embodiment described herein, can detect and report to the control processor 47 whether a person, an answering machine (or voice mail), a facsimile machine, or a modem has answered the call. For instance, the DSP 42 of the preferred embodiment has been found to detect voice accurately approximately 98% of the time in as little as 1/10th of a second and can detect approximately 80–90% of answering machines. Further, the DSP 42 can detect whether there is silence on the line, this silence possibly indicating that the caller is not responding to a particular prompt. Once the control processor 47 receives any of these indications from the DSP 42, it informs the algorithm running on the processor 34 via the PCI bus 46.

As described above, the second essential operation of the telephone line interface 38 for the preferred embodiment of the present invention is its ability to send audio voice signal signals to the PSTN 26. In the preferred case of FIG. 2, once a telephone session has been established, the sending of voice to the PSTN 26 is straight forward. In this case, the processor 34 will send a voice signal within a digitized format to the DSP 42 via PCI bus 46, the control processor 47 and the control bus 44. The DSP 42 sends the digitized voice to the CODEC 41 to be converted to analog voice and then to the physical line interface 40 for transmission to the telephone line 25.

Other functions of the telephone line interface 38 of FIG. 2 that could be used within exemplary embodiments of the present invention relate to its ability to function as a modem that receives and sends data via the telephone line 25, and its ability to receive and process audio voice signals. When receiving audio voice signals, the DSP 42 receives digitized versions of the signals from the CODEC 41 and further forwards these audio signals within digitized format, via the control processor 47, to the processor 34 of the computing device 20.

As previously mentioned, there are a considerable number of possible alternatives to the telephone line interface 38 of FIG. 2. The key is that the interface 38 used have the minimum functionality required for the implementation of the present invention. Further, numerous alternatives in operation could be made even within the telephone line interface 38 of FIG. 2 and so the above description of one particular operation is not meant to limit the scope of the present invention.

Preferably, as described above, the processor 34 controls the operation of the telephone line interface 38 and is the source of call initiation signals and the destination of telephone line indications being detected on the telephone line 25. In alternative embodiments, the memory device 36 or another device not illustrated within the simplified block diagram of FIG. 1 could take over either of these roles.

An operation performed by an event scheduling program, according to preferred embodiments of the present invention, will now be described in detail with reference to FIGS. 3A, 3B, 4, 5A and 5B; the event scheduling program being stored within the memory device 36 and run on the processor 34. FIG. 3A is a table illustrating scheduled events that are stored within a first format in the memory device 36. As depicted, the table comprises an event message column 50, a start time column 52, an end time column 54, a remind time column 56 and a priority order settings column 58. Preferably, the user of the scheduling program enters information in each of these columns for each scheduled event; the entering of this information preferably being done with the use of the user interface 22 along with a Graphical User Interface (GUI) being displayed on the display screen 24. Within FIG. 3A, the information within the event message column 50 comprises text of reminders to be sent to the user. The information within the start and end time columns 52, 54 comprises time/dates that particular events are to commence and terminate respectively. The information within the remind time column 56 comprises time/dates in which the user has requested to be reminded of particular events. In some embodiments, this information is stored as a relative time to the information within the start time column 52. The information within the priority order settings column 58 comprises preferences the user has selected with respect to the order in which reminder operations are to be attempted. This information will be described in detail herein below with reference to FIG. 7 for an exemplary embodiment of the present invention.

In the sample table of FIG. 3A, there are first, second and third events 60,62,64 scheduled. The first event 60 comprises an event message of "Meeting with client X at one o'clock", a start time of "1300 09/30/99", an end time of "1600 09/30/99", a remind time of "1130 09/30/99" and remind settings of "Normal". The second event 62 comprises an event message of "Picnic at Oak Park at eleven o'clock", a start time of "1100 10/02/99", an end time of "1300 10/02/99", a remind time of "0900 10/02/99" and remind settings of "Weekend". The third event 64 is an all day event that comprises an event message of "Grandmother's birthday today", a start time of "0000 09/30/99", an end time of "2359 09/30/99", a remind time of "0800 09/30/99" and remind settings of "Display Only".

In operation as will be described herein below with reference to FIGS. 4, 5A and 5B, the key columns within the table of FIG. 3A for the preferred embodiments of the present invention are the event message column 50 and the remind time column 56. The other columns 52,54,58 are not included in all embodiments, though scheduling programs according to preferred embodiments would contain such information for each event.

FIG. 3B illustrates an alternative version of the preferred table of FIG. 3A in which the events are stored within a second format. In this case, the information within the event message column 50 comprises file names that correspond to audio files stored for particular events. These audio files could either consist of audio recordings produced by the user or text reminder messages that have been converted to audio. In either case, the audio files are designed to be played for the user at a predetermined time, that being the remind time. Preferably, the audio files are stored within the standard Wave format though alternatively other formats could be used. In the sample table of FIG. 3B, the first event 60 comprises an audio file "AAAAA.wav", the second event 62 comprises an audio file "AAAAB.wav" and the third event 64 comprises an audio file "AAAAC.wav".

Figure 4:
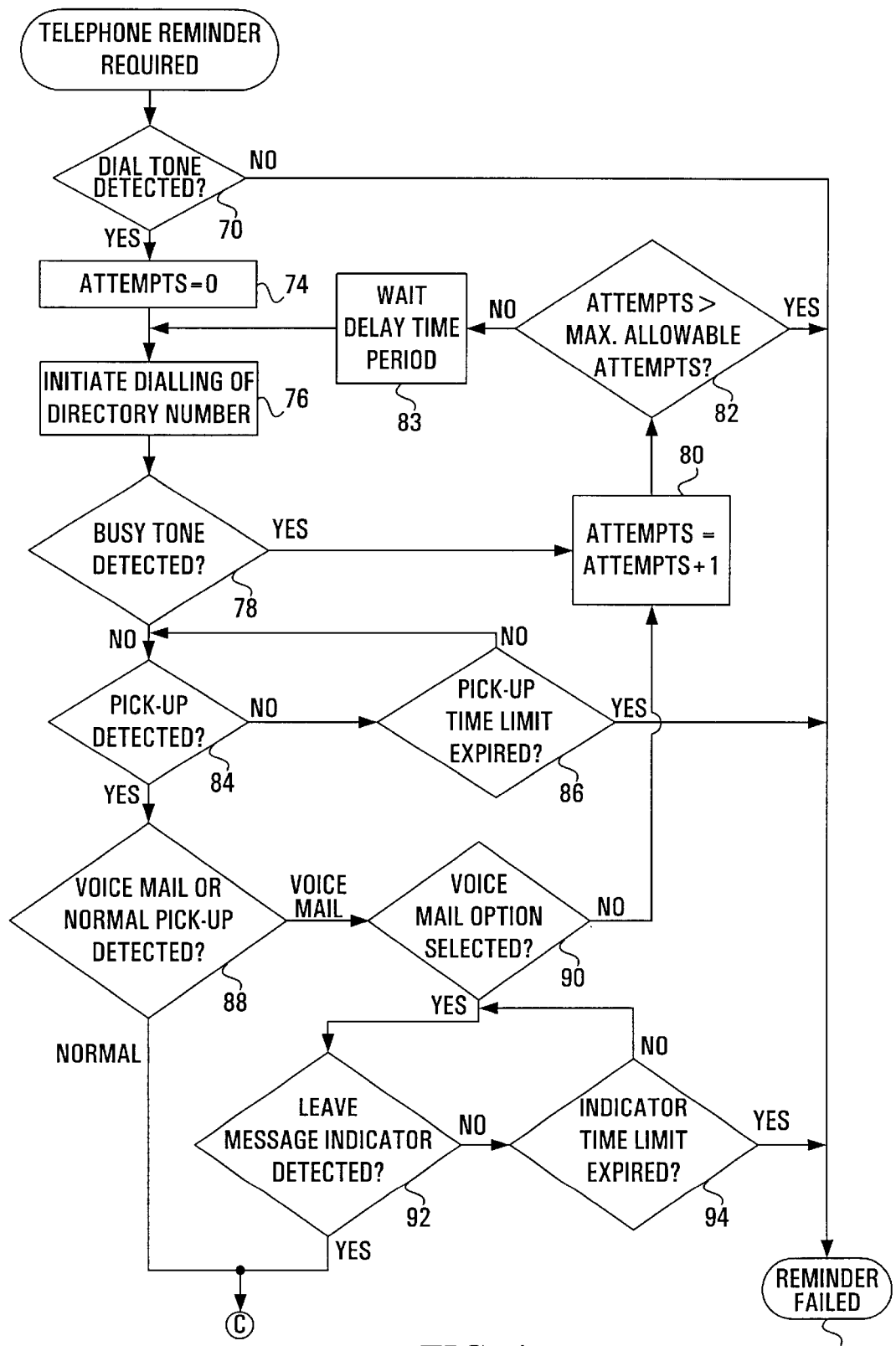
FIG. 4 is a flow chart illustrating a first set of steps performed by a scheduling program during a telephone reminder operation according to a preferred embodiment of the present invention.
Figure 5A:
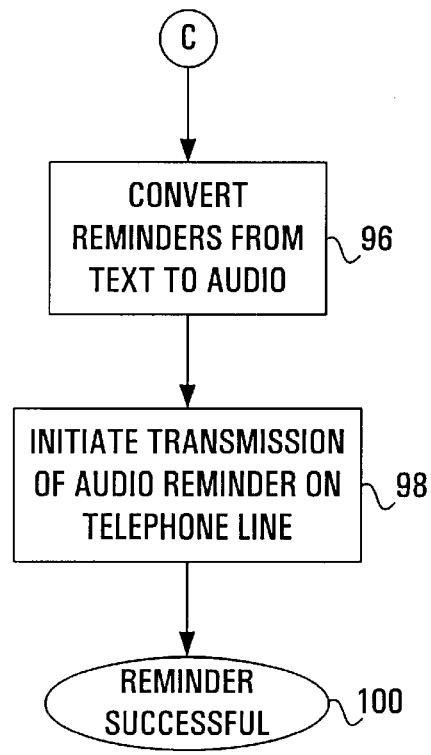
FIGS. 5A and 5B are flow charts illustrating second sets of steps performed by a scheduling program during a telephone reminder operation according to a preferred embodiment of the present invention when the scheduled events are in first and second formats respectively.
Figure 5B:
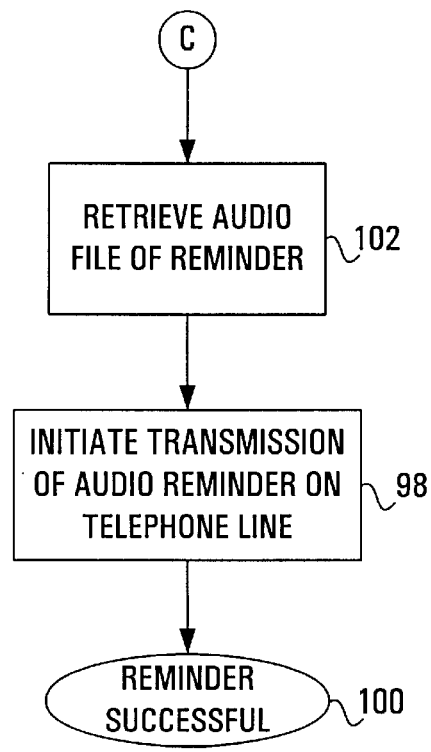

FIGS. 4, 5A and 5B are flow charts that together illustrate the steps performed by a scheduling program during a telephone reminder operation according to preferred embodiments of the present invention. FIG. 4 illustrates a first set of steps performed by the scheduling program no matter if the event is stored in the first or second format. FIGS. 5A and 5B illustrate second sets of steps performed by the scheduling program if the event is stored in the respective first and second formats.

The first step of the telephone reminder operation depicted in FIG. 4 is for the scheduling program to detect whether there is a dial tone on the telephone line 25 at step 70. This is done by the processor 34 interacting with the telephone line interface 38 and more specifically the control processor 47, the control processor 47 normally monitoring for such dial tones. If no dial tone is detected, the reminder attempt is considered to have failed at step 72. Having no dial tone indicates that the telephone line interface 38 cannot initiate a telephone session with another device on the PSTN 26. This could be because another telephone session is already established, hence the control processor 47 indicates that an off-hook condition is currently detected, or that the telephone line 25 is not coupled to the PSTN 26.

If a dial tone is detected at step 70, the scheduling program sets an attempt counter to zero at step 74 and initiates dialing of a directory number at step 76. This directory number is a predetermined number entered by the user that could correspond to a fixed wire telephone station such as the first telephone station 30 or a wireless telephone station such as the second telephone station 32. A GUI used for the inputting of one or more of these directory numbers is described for an exemplary embodiment herein below with reference to FIG. 7. To dial the directory number at step 76, the scheduling program within the processor 34 proceeds to send a call initiation signal comprising the directory number to the control processor 47 within the telephone line interface 38, the further operations of the call initiation operation preferably being controlled by the control processor 47 as described previously.

Next, after the sending of the call initiation signal at step 76, the scheduling program monitors for a busy tone at step 78 by determining whether a busy tone indication is output from the telephone line interface 38, as described above. Although depicted as a separate step on FIG. 4, the monitoring for a busy signal is actually inherent after the sending of a call initiation signal.

If a busy tone is detected at step 78, the attempts counter increases by one at step 80 and, as depicted at step 82, it is determined whether the attempts counter is greater than a maximum allowable attempts value. The maximum allowable attempts value limiting the number of times a telephone reminder operation is attempted. In the case that the maximum allowable attempts has been exceeded at step 82, the telephone reminder has deemed to have failed at step 72. If the attempts counter is equal to or less than the maximum allowable attempts value at step 82, the procedure of the scheduling program waits a delay time period at step 83 and then returns to step 76.

If no busy tone is detected at step 78, the scheduling program proceeds to determine at step 84 whether a pick-up has occurred at the telephone station corresponding to the directory number dialed. The determination of a pick-up is achieved in a preferred embodiment by the DSP 42 within the telephone line interface 38. The actual procedure used to determine whether a pick-up has occurred in some embodiments includes monitoring for a lack of ring tones for a predetermined time period, monitoring for voice signals, and/or monitoring for other interfacing indications such as a ringback.

If no pick-up is detected at step 84, the scheduling program determines whether a pick-up time limit is expired at step 86. This time limit expiration could be related to the number of ring signals exceeding a maximum allowable number of ring signals or alternatively could be related to a timing algorithm. If the pick-up time limit is not expired, the procedure returns to step 84 while, if it is expired, the scheduling program determines that the telephone reminder has failed at step 72.

If a pick-up is detected at step 84, the scheduling program of FIG. 4 determines at step 88 what type of pick-up it is, that is whether it is a voice mail pick-up in which a voice mail system answered the call or a normal pick-up in which a person answered the call. Other types of pick-ups are not considered in this simple flow chart since it is presumed that the user of the scheduling program has specified a directory number corresponding to a handset and not one corresponding to a modem or facsimile machine.

If a voice mail pick-up is detected at step 88, the scheduling program determines whether the user has selected a voice mail option for the particular directory number at step 90. The selection of the voice mail option would indicate that the user would consider a message left on a voice mail account as a successful telephone reminder operation. In cases that the user has not selected the voice mail option, the scheduling program preferably proceeds to step 80 described above. In this case, the voice mail pick-up is considered a failed attempt and the procedure continues at step 76 after a delay unless a maximum number of failed attempts has been met.

If the user has selected the voice mail option at step 90, the scheduling program monitors for a leave message indication at step 92. There are a number of different techniques, according to preferred embodiments, in which the DSP 42 can detect a leave message indication and inform the scheduling program being run on the processor 34. In one embodiment, the DSP 42, after determining that a voice mail pick-up has occurred, monitors for one of many well-known distinctive tones that are typically transmitted by a voice mail system on the telephone line 25 to indicate to a person that anything subsequently spoken will be recorded as a voice message. In another embodiment, the DSP 42 monitors for a period of silence after a voice mail pick-up, this silence indicating that a message can now be left. In yet another embodiment, the DSP 42 sends a DTMF signal code, such as the DTMF tone for "#", to the telephone line, this DTMF signal code triggering the voice mail system to skip the greeting message and hence be receptive to receiving a voice message. In other embodiments, the DSP monitors for a leave message indication in another manner that could include more than one of the above described operations.

If the leave message indicator is not detected at step 92, the program preferably determines whether an indicator time limit has expired at step 94. If the time limit has not expired, the procedure returns to step 92 while, if the indicator time limit has expired, the scheduling program determines that the telephone reminder operation has failed at step 72. It is noted that in some cases no indicator time limit is required, the case that the DSP 42 sends a DTMF signal code to skip the greeting message being an example. In that case, the DSP 42 determines that the leave message indicator is detected once the DTMF signal code is sent.

In the case that a normal pick-up is detected at step 88 or a leave message indicator is detected at step 92, the scheduling program proceeds to the second set of steps illustrated on FIGS. 5A and 5B. In the case that the event message is stored in text format, the scheduling program proceeds to convert the reminder from text format to an audio format such as Wave at step 96 within FIG. 5A. This can be done with the use of well-known text-to-voice software algorithms. In the case that the event message is stored as an audio file, the scheduling program proceeds to retrieve the audio file at step 98 within FIG. 5B. In either case, the scheduling program subsequently initiates transmission of the audio reminder on the telephone line 25 at step 100. This is done by sending audio signals within a digitized format to the control processor 47 within the telephone line interface 38, this further resulting in the operation described in detail for the transmitting of analog voice signals, via the PSTN 26, to either the telephone station or voice mail account corresponding to the directory number dialed. Once this transmission is complete, the scheduling program deems the telephone reminder operation successful at step 102.

The procedure illustrated within FIGS. 4, 5A and 5B could include numerous alternatives, such as considering the telephone reminder operation a failure if any one of a dial tone is not detected, a busy tone is detected, or a voice mail pick-up is detected. Further, one skilled in the art would understand that the procedure could be modified for the case that a digital telephone line was utilized, this requiring modifications within the telephone line interface 38.

Scheduling programs according to exemplary embodiments of the present invention in which event reminders are sent in series are now described with reference to FIGS. 6 through 9. During a reminder operation within these exemplary embodiments, if one event reminder fails, another event reminder selected as a second choice by the user is attempted. Preferably, these exemplary embodiments of the present invention include telephone reminder operations but this should not limit the scope of the present invention. In fact, various reminder operations could be used in series with none of them necessarily being telephone reminder operations.

Figure 6:
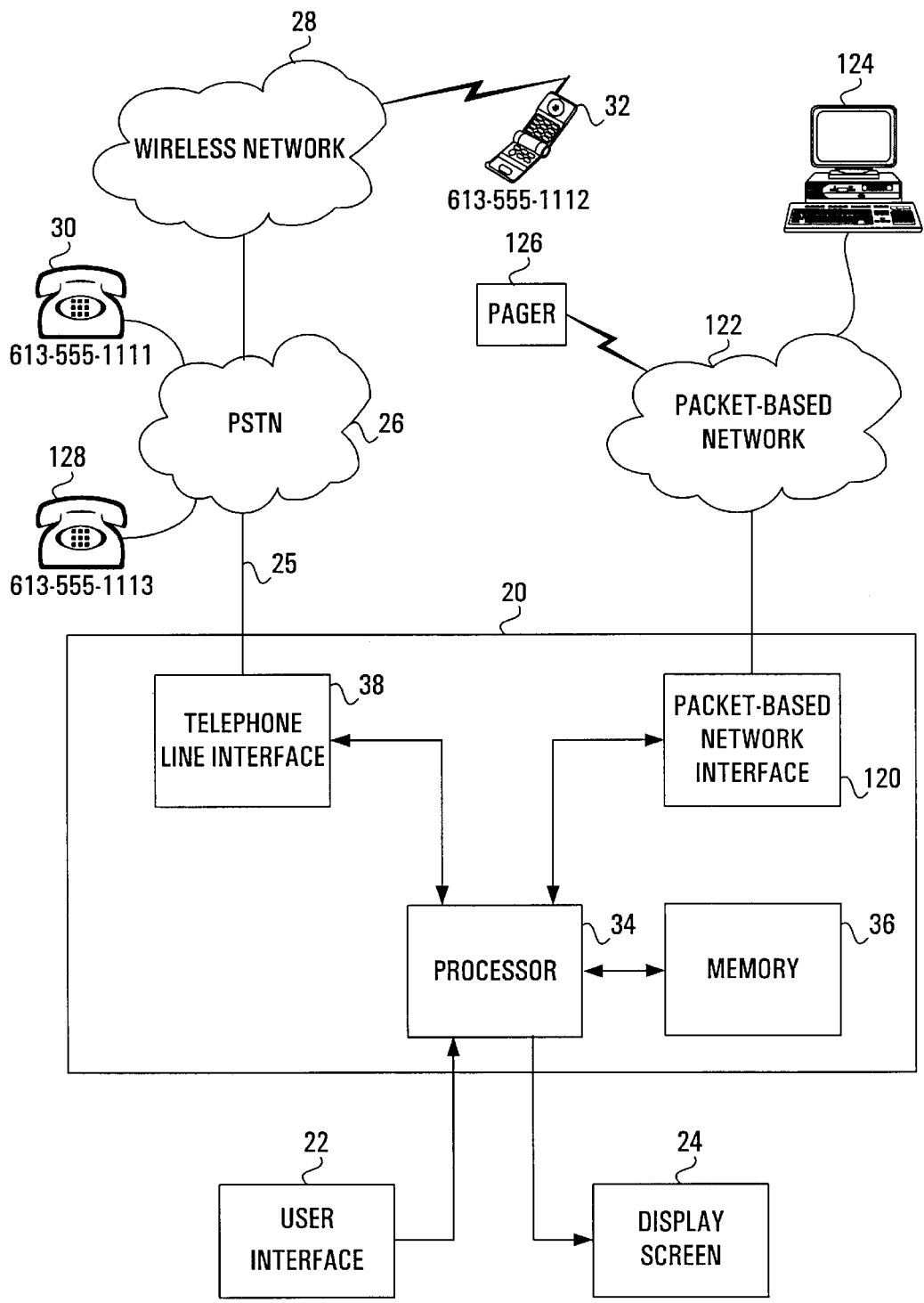
FIG. 6 is a simplified block diagram illustrating a second possible event reminder system according to embodiments of the present invention.

FIG. 6 is a block diagram illustrating an event reminder system identical to FIG. 1 as previously described but with additional components that allow for additional reminder operations to be implemented as will be described herein below. In particular, within FIG. 6, the computing apparatus 20 further comprises a packet-based network interface 120 coupled to the processor 34 and further coupled to a packet-based network 122. The packet-based network 122, which is preferably an Internet Protocol (IP) network, is further coupled to a second computing apparatus 124 and, via a wireless link, to a pager 126 capable of receiving email text messages. Further, as depicted within FIG. 6, a third telephone station 128 is coupled to the PSTN 26, in this case the third telephone station 128 is a fixed wire telephone station with a directory number of 613-555-1113.

According to exemplary embodiments of the present invention, a scheduling program, that is run on the computing apparatus 20 within FIG. 6, can perform a variety of different reminder operations as selected by the user. For instance, the scheduling program can display a reminder text message on the display screen 24; can send an email reminder message, via the packet-based network interface 120 and the packet-based network 122, to an email account which could subsequently be accessed by the second computing apparatus 124; can send an email reminder message, via the packet-based network interface 120 and the packet-based network 122, to the pager 126; and can initiate a telephone reminder operation with one of the first, second and third telephone stations 30,32,128, those being work, wireless and home telephones respectively. It should be understood that these reminder operations are not meant to limit the present invention. Other reminder operations could be performed such as the computing apparatus 20 sending a reminder text message to a facsimile machine or sending a reminder message within a numerical format to a standard alphanumeric pager via the PSTN 26. In the case of the alphanumeric pager, the computing apparatus 20 could send a particular code number that indicates that an email or voice mail reminder has previously/concurrently been sent. The selection of which of these reminder operations to attempt and in which order to attempt them is preferably selected by the user of the scheduling program as a set of reminder preferences.

FIG. 7 illustrates a GUI according to preferred embodiments that could be displayed on the display screen 24 in order to aid the user in selecting reminder preferences for an event scheduling program being run on the computing apparatus 20. As depicted, the GUI of FIG. 7 comprises a list 140 of reminder operations; a destination address window 142 for each of the reminder operations within the list 140; a variety of priority order lists 144,146 that control the order in which reminder operations are attempted; an attempts window 148 for each of the reminder operations within the list 140 that indicates the number of attempts to try each reminder operation, the default being one attempt in this example; and a delay window 149 for each of the reminder operations within the list 140 that indicates the delay in minutes to wait between attempts. In the sample GUI of FIG. 7, the list 140 of reminder operations comprises a display screen reminder operation, an email reminder operation, a pager (with email address) reminder operation, a work telephone reminder operation, a wireless telephone reminder operation, a home telephone reminder operation, a facsimile reminder operation, and a pager (with directory number) reminder operation. The list of reminder operations preferably can be modified to compensate for the particular capabilities of a user. To this end, the GUI of FIG. 7 further comprises a "CREATE NEW SELECTION OPTION BUTTON" 152 which if selected allows the user to generate additional reminder operations to be added to the list 140. Further, although not shown, the GUI of FIG. 7 would presumably also have a technique for removing reminder operations from the list 140.

The destination address windows 142 preferably contain the email address or telephone directory number applicable for the corresponding reminder operation. For the display screen reminder operation, the corresponding destination address window 142 is preferably not applicable; although, in alternative embodiments in which multiple display screens can be accessed from a central computing apparatus, an address for a particular display screen could be entered into the destination address window 142. In a further alternative embodiment, more than one email address or telephone phone number could be included within each of the destination address windows 142. In other embodiments, the same logical operation occurs but the user sets up additional reminder operations with the same reminder technique, such as two separate email operations with different email addresses.

Further within FIG. 7, the GUI comprises a "CREATE NEW PRIORITY ORDER" button 150 which if selected allows the user to generate additional priority order lists. In the example illustrated in FIG. 7, there are first and second priority order lists 144,146 created, those being "NORMAL" and "WEEKEND" lists. Preferably, the user selects a particular priority order list for each event scheduled, the priority order list being stored within the priority order settings column 58 within the tables of FIGS. 3A and 3B. In the example GUI of FIG. 7, the user has selected the "NORMAL" priority order to have the display screen reminder operation attempted first, the work telephone reminder operation attempted second, the wireless telephone reminder operation attempted third, and all of the email reminder operation, the pager (with email address) reminder operation and the facsimile reminder operation attempted fourth in parallel. The user has selected the "WEEKEND" priority order to have the wireless telephone reminder operation attempted first, the home telephone reminder operation attempted second, and both of the email reminder operation and the pager (with directory number) reminder operation to be attempted third in parallel.

With use of a selected priority order, the scheduling program according to exemplary embodiments of the present invention can dynamically adjust which reminder operation to utilize while attempting to inform a user of an upcoming scheduled event. The key to this exemplary embodiment is that the reminder operations selected to be within a particular priority order must be capable of determining whether the particular operation is successful or not. The exception to this requirement is with respect to reminder operations selected as the lowest priority within a priority order, these being reminder operations that have no further reminder operations performed if they fail. The requirement exists for higher priority reminder operations since the scheduling program controlling the reminder operations must be capable of determining whether a further reminder operation is necessary. In cases where two or more reminder operations are attempted in parallel, both attempts must be deemed a failure prior to attempting a further reminder operation lower on the priority order.

With reference to FIGS. 4, 5A and 5B, a telephone reminder operation is described according to the preferred embodiments of the present invention in which the attempt is eventually declared a success or failure. Hence, using this described telephone reminder operation, a confirmation that the user has received the reminder can be received by the event scheduling program. Other reminder operations are now described with reference to FIGS. 8 and 9 that also allow for confirmations of success to be received by the scheduling program, these confirmations being used to stop the initiation of further attempts to remind the user.

Figure 8:
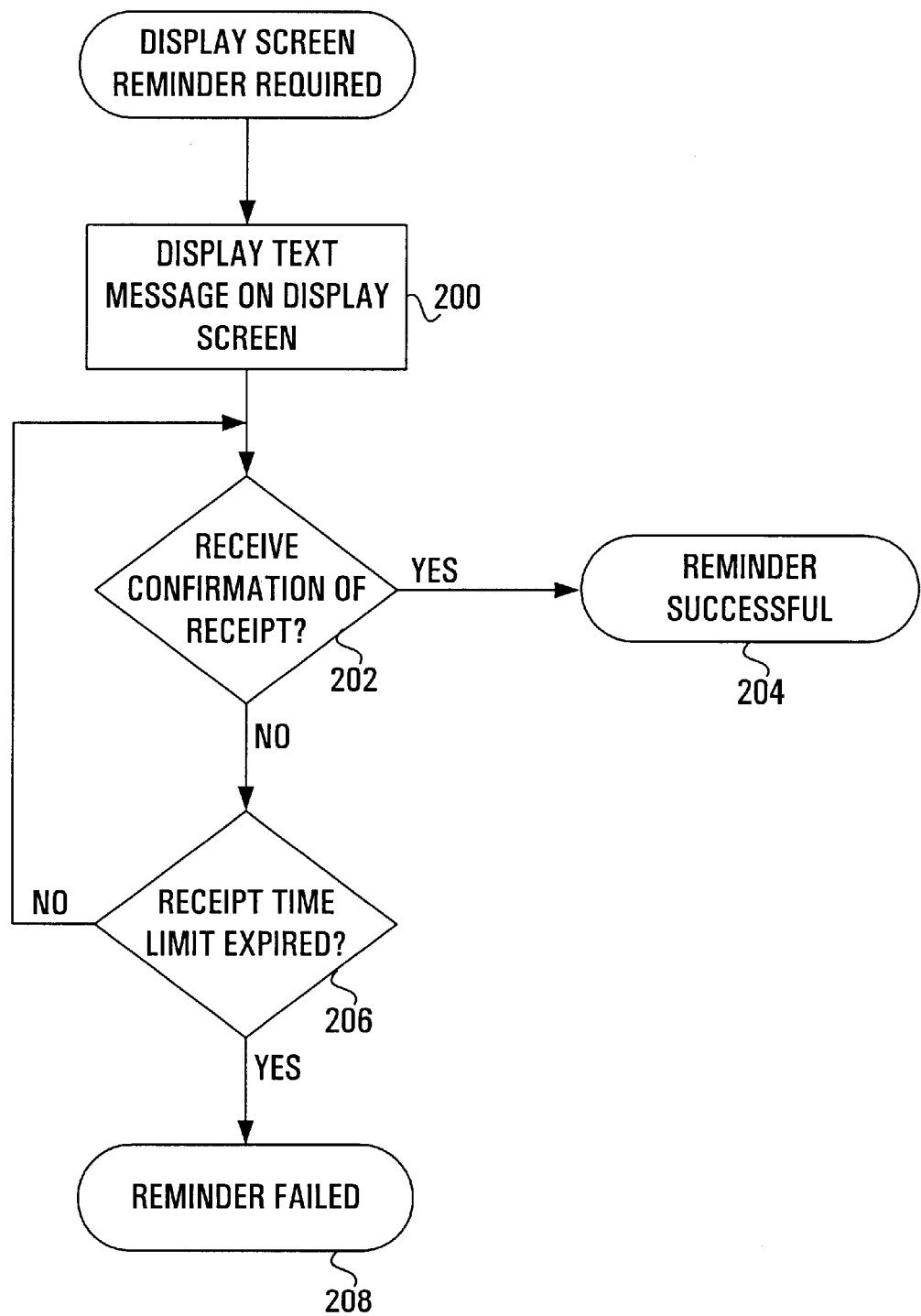
FIG. 8 is a flow chart illustrating the steps performed by a scheduling program during a display screen reminder operation according to a preferred embodiment of the present invention.

FIG. 8 is a flow chart illustrating the steps performed by a scheduling program during a display screen reminder operation according to preferred embodiments of the present invention. In this case, the scheduling program begins by opening a window on the display screen 24 and subsequently displaying a reminder text message within the window as depicted at step 200. Next, the scheduling program monitors for a confirmation of receipt signal from the user interface 22 at step 202. This confirmation of receipt signal is preferably generated by a user of the computing apparatus 20 pressing an "OK" button on the window with use of a mouse. If the confirmation of receipt signal is received at the scheduling program, the reminder operation is deemed successful at step 204. If it is not received, the program determines if a receipt time limit has expired at step 206. If the time limit has not expired, the procedure preferably returns to step 206. If the time limit has expired at step 206, the reminder operation is deemed to have failed at step 208. A failure of a display screen reminder operation at step 208 could occur if the user is not currently operating on the computing apparatus 20. Despite the failure, the window containing the reminder text message preferably remains on the display screen 24 until the user presses the "OK" button.

Figure 9:
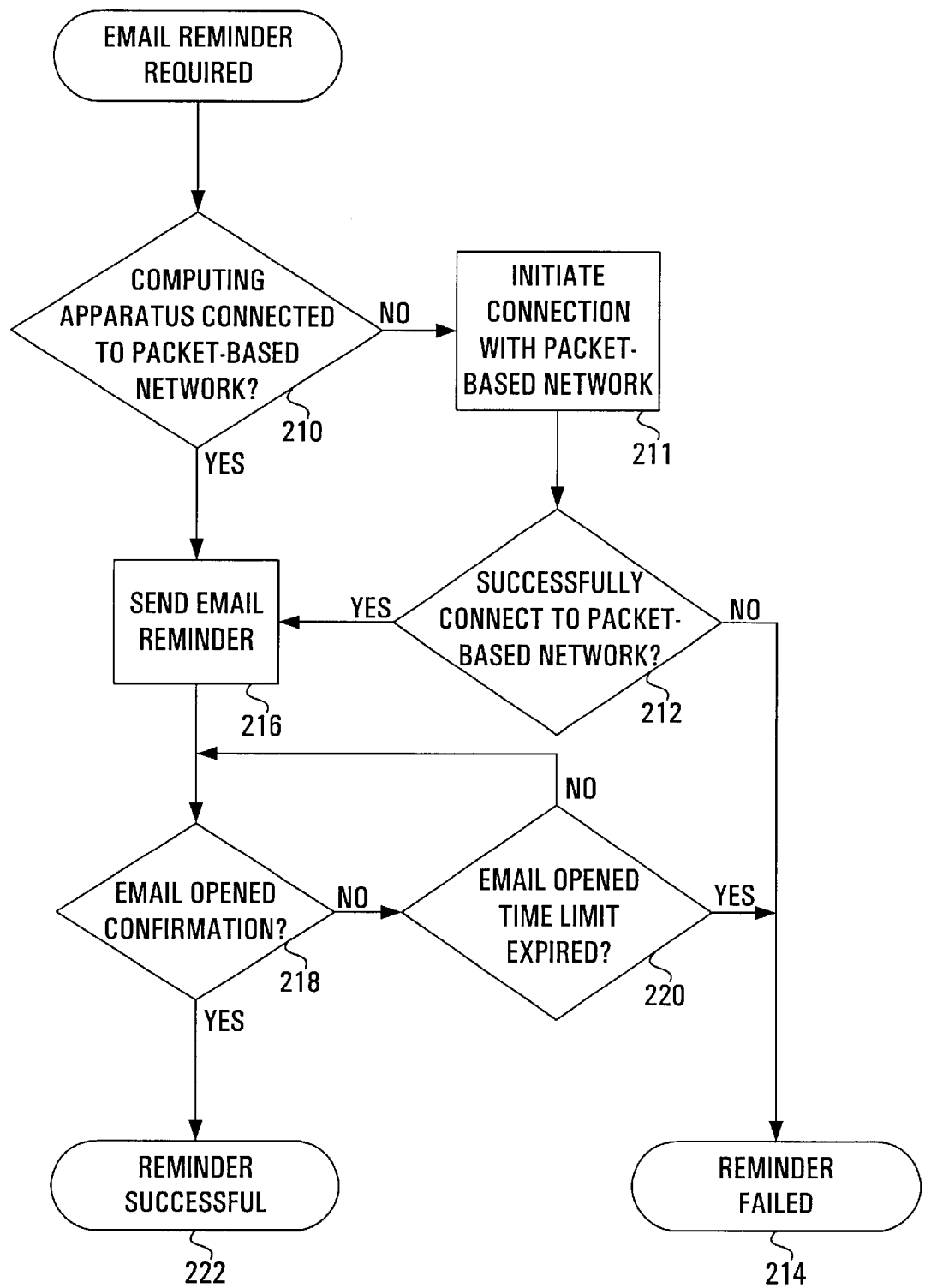
FIG. 9 is a flow chart illustrating the steps performed by a scheduling program during an email reminder operation according to a preferred embodiment of the present invention.

FIG. 9 is a flow chart illustrating the steps performed by a scheduling program during an email reminder operation according to preferred embodiments of the present invention. Initially, the scheduling program determines at step 210 whether the computing apparatus 20 is connected to the packet-based network 122, the packet-based network preferably being the Internet. If it is determined that the computing apparatus is not connected to the packet-based network 122, the scheduling program attempts to initiate the connection with the packet-based network 124 at step 211. This initiation is preferably done through well-known techniques via the packet-based network interface 120, the packet-based network interface 120 preferably being a network card. Alternatively, the initiation of a connection with the packet-based network could be done through a dial-up procedure via the telephone line interface 38, the telephone line 25 and the PSTN 26. In this case, a telephone session initiation operation within the telephone line interface 38 would be required to establish a connection between a packet-based network interface, such as an Internet Service Provider (ISP), and the computing apparatus 20.

The scheduling program then determines at step 212 whether the connection to the packet-based network 122 was successfully established. If the connection was not successfully established, the email reminder operation is considered to have failed at step 214. If the scheduling apparatus 20 determines that a connection is established with the packet-based network 122 at either one of steps 210 or 212, the scheduling program proceeds at step 216 to send an email containing a reminder text message to the destination email address specified by the user.

For the operation of FIG. 9, a message open confirmation option is activated so that a confirmation is requested to be sent back to the computing device 20 when the email message is opened. Therefore, in FIG. 9, after sending the email at step 216, the scheduling program then proceeds to monitor at step 218 for the confirmation that the email has been opened. The sending of such confirmations is well-known within many current email systems. If the email opened confirmation is not received, the program determines whether an email opened time limit has expired at step 220. If the time limit has not expired, the procedure returns to step 218 while if the time limit has expired, the email reminder operation is considered a failure by the scheduling program at step 214. If the email opened confirmation is received at step 218, the email reminder operation is deemed a success at step 222.

Although not explicitly described, it should be recognized that other reminder operations could have similar steps for determining if a reminder operation is a success or a failure. For instance, if a pager reminder operation is utilized, a similar operation to that illustrated in FIG. 8 could be used if the pager had two-way capabilities. Further, in the case of a facsimile reminder operation, a successful reminder operation could be declared if the facsimile is successfully received at the destination machine, a failure being the case that no successful confirmation is received. Of course, successful transmission of a facsimile does not guarantee the user will receive the reminder in a timely fashion.

In one particular embodiment of the present invention, security of the reminder messages is an issue. The primary reason for requiring security with regard to the reminder messages concerns the ability to ensure that the reminder message reaches the appropriate person. For instance, in the case that a telephone station being shared amongst a number of people is used in a telephone reminder operation, the person in which the reminder message is intended may not receive the message since another person may answer the telephone call, the reminder message subsequently being broadcast to this other person. Further, in some specific circumstances, confidentiality issues could require security to be implemented with regard to reminder messages. Using reminder operations such as email and voice mail allows for sufficient security since these operations have password confirmations built in to their initiation procedure.

A modification can be made in the telephone reminder operation as described above with reference to FIGS. 4, 5A and 5B to expand the operation to areas in which security is an issue. In this embodiment, as described below in detail, a person answering a reminder telephone call must provide a verification parameter, such as entering a passcode on the dialpad of the telephone station, to confirm the reminder message is being broadcast to the proper individual. Alternatively, the verification parameter could be a password in the case that speech recognition software is activated to determine the word or phrase that is spoken.

Figure 10:
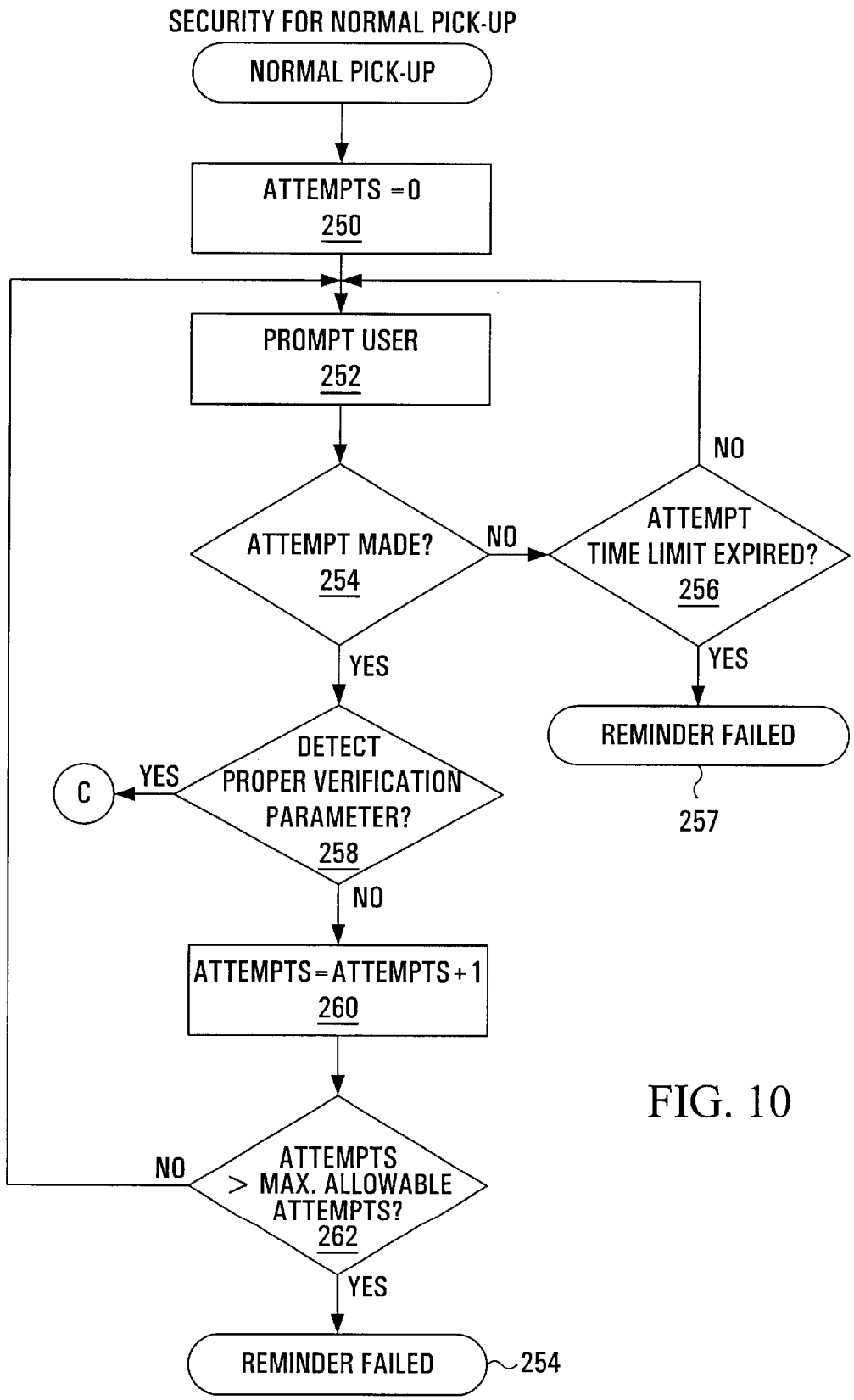
FIG. 10 is a flow chart illustrating security steps performed prior to the second set of steps of FIGS. 5A, 5B by a scheduling program according to a preferred embodiment of the present invention.

FIG. 10 is a flow chart illustrating security steps performed prior to the second set of steps of FIGS. 5A, 5B by a scheduling program according to a preferred embodiment of the present invention. As depicted in FIG. 10, once a normal pick-up is detected at step 88 of FIG. 4, the following security steps are performed prior to sending the audio reminder. Firstly, an attempts counter is set to zero at step 250 and, as depicted at step 252, a prompt is sent to the person who picked up the call. This prompt is preferably sent in the identical manner in which the actual audio reminder message is sent as described above with reference to FIGS. 5A and 5B. Instead of the audio reminder message being sent though, a predetermined prompt message is transmitted such as "You have a new reminder message. Please enter your passcode to receive it" or for the alternative case in which the verification parameter is a spoken password ". . . . Please say your password to receive it".

Next, as depicted at step 254, the scheduling program monitors to determine if an attempt is made to enter a passcode or say a password, as the case may be. This is preferably done within the telephone line interface 38 with use of the DSP 42. In the case of the passcode, the DSP 42 monitors for a set of DTMF signals being pressed by the person who answered the call that together might constitute an attempt at entering a passcode. In the case of the password, the DSP 42 simply passes any audio signals received from the person who answered the call to a speech recognition software preferably being run on the processor 34. If no attempt is made at step 254, the scheduling program determines if an attempt time limit has expired at step 256. If the time limit has expired, the reminder is deemed to have failed at step 257 while, if not expired, the procedure returns to step 254.

If an attempt is made at step 254, the scheduling program determines if the person who answered the call has selected the proper verification parameter at step 258. This is done by comparing the entered passcode detected by the DSP 42 or the spoken password detected by the speech recognition software by the proper passcode or password respectively. If they do not match at step 258, the attempts counter is incremented at step 260 and the scheduling program determines if the attempts is greater than a maximum allowable number of attempts at step 262. If the maximum allowable number of attempts has been exceeded, the telephone reminder operation fails at step 264. If not, the procedure of FIG. 10 returns to prompting the person who answered the call at step 252.

If the verification parameter that was entered by the person who answered the telephone call matches the proper verification parameter at step 258, the scheduling program then proceeds to the second set of steps performed by the scheduling program shown in FIGS. 5A, 5B.

In an alternative to the embodiment shown in FIG. 10, the transmitting of the reminder message could take place first with the verification parameter simply being used as a confirmation that the reminder was successful. In this way, this alternative is comparable to signing off that you have received the message.

Although the present invention is described for the case that a scheduling program is stored and run within a computing apparatus such as a personal computer, this should not limit the scope of the present invention. For instance, an event scheduling program could be implemented within a packet-based network server similar to well-known scheduling programs that are currently implemented at various web pages on the Internet. In this case, a user would have to register with the web page to gain access to the scheduling program and then utilize GUIs defined by the web page to schedule events, define reminder preferences, and set priority orders. The server itself could then be utilized to perform the reminder operations including telephone reminder operations if the server is coupled to the PSTN 26.

Another modification to the scheduling program according to the preferred embodiment could be made for the case that the telephone network was a packet-based network allowing for audio data packets to be exchanged during telephone session. For example, the present invention could be implemented within a Voice over Internet Protocol (VOIP) system. In this case, the telephone line interface 38 would not be required as the packet-based network interface 120 could be utilized during telephone reminder operations.

In general, the present invention is directed at event scheduling logic that is preferably an event scheduling software algorithm. It should be recognized that any apparatus that contains event scheduling logic according to the present invention should therefore be within the scope of the present invention, such as a computer readable memory containing the event scheduling logic.

Persons skilled in the art will appreciate that there are yet more alternative implementations and modifications possible for implementing the present invention, and that the above implementations are only illustrations of certain embodiments of the invention. The scope of the invention, therefore, is only to be limited by the claims appended hereto.

I claim:

1. A computing apparatus arranged to provide event reminder messages to a user, said computing apparatus comprising memory and event scheduling logic that:

stores a user's scheduled events;

stores an event reminder corresponding to each said scheduled event, each said event reminder including a reminder time parameter, an event reminder message, and a priority order setting specifying a priority order list for reminder operations to be attempted for the corresponding scheduled event;

stores a directory of destination address information, including destination addresses, corresponding to each of the reminder operations;

stores each priority order list specified in each said priority order setting, each said priority order list defining a preferred order of reminder operations;

monitors to determine if the remind time parameters of any said event reminder is met; and for each event reminder for which the remind time parameter is met, determines a reminder operation to be attempted for the event reminder based on the priority order setting of the event reminder and the stored priority order lists, accesses the destination address information for the reminder operation to be attempted, and then initiates communication between the computing apparatus and the destination address for the reminder operation to be attempted.

2. A computing apparatus as defined in claim 1 wherein said computing apparatus converts the event reminder message into a signal for transmission through a network to said destination address.

3. A computing apparatus as defined in claim 1 wherein said event scheduling logic determines that more than one reminder operation is to be attempted for the event reminder, accesses the destination address information for each reminder operation to be attempted, and then initiates communication between the computing apparatus and each of the more than one destination address, whereby the event reminder message is conveyed to more than one destination address.

4. A computing apparatus as defined in claim 3 wherein the communications between the computing apparatus and each destination address are initiated to serially transmits a plurality of signals to the more than one destination address in order of preference based on the stored priority order lists and the priority order setting of the event reminder.

5. A computing apparatus as defined in claim 4 wherein the computing apparatus serially transmits the plurality of signals in order of preference based on the stored priority order lists and the priority order setting of the event reminder only after a communication device associated with a destination address is unresponsive.

6. A computing apparatus as defined in claim 5 wherein said computing apparatus is capable of detecting whether the event reminder message has been fully transmitted to the destination address.

7. A computing apparatus as defined in claim 6 wherein said computing apparatus is further capable of re-initiating communication with a destination address until it exceeds a pre-set number of attempts, at which point the computing apparatus transmits another signal to another of the more than one destination address in accordance with the priority order setting in the event reminder and the stored priority order lists.

8. A computing apparatus as defined in claim 7 wherein said computing apparatus transmits a verification prompting signal to the destination address, the verification prompting signal encoding a verification prompt such that the destination returns a verification parameter to the computing apparatus which the computing apparatus authenticates prior to transmitting a signal encoding the event reminder message.

9. A computing apparatus as defined in claim 1 wherein each said destination address is associated with a respective remote communication device, and wherein said remote communication device is selected from the group consisting of telephones, cell phones, pagers, fax machines, computers with e-mail, and hand-held wireless devices capable of text-messaging.

10. A computing apparatus as defied in claim 8 wherein each said destination address is associated with a respective remote communication device, and wherein said remote communication device is selected from the group consisting of telephones, cell phones, pagers, fax machines, computers with e-mail, and hand-held wireless devices capable of text-messaging.

* * * * *